March 4, 1969   C. L. WILSON   3,431,444
GENERATOR
Filed Dec. 14, 1966
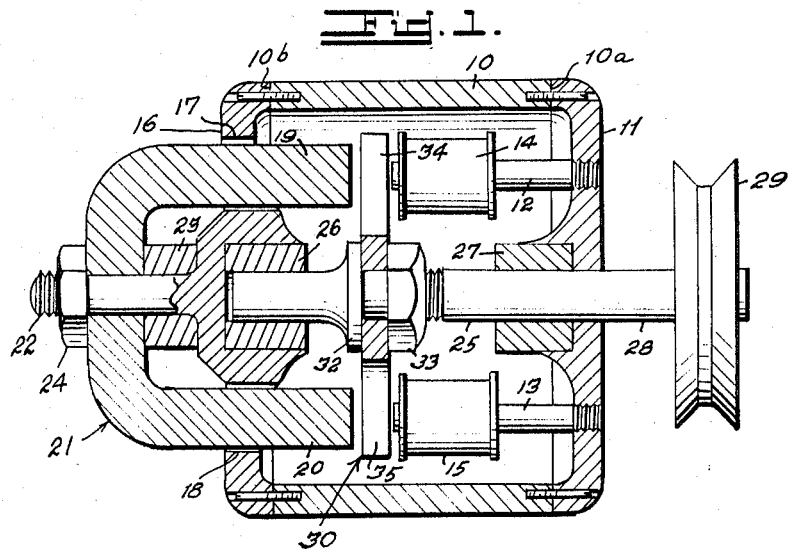
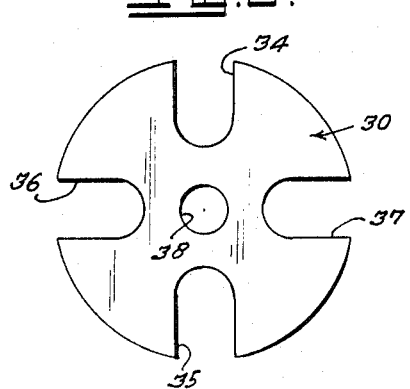
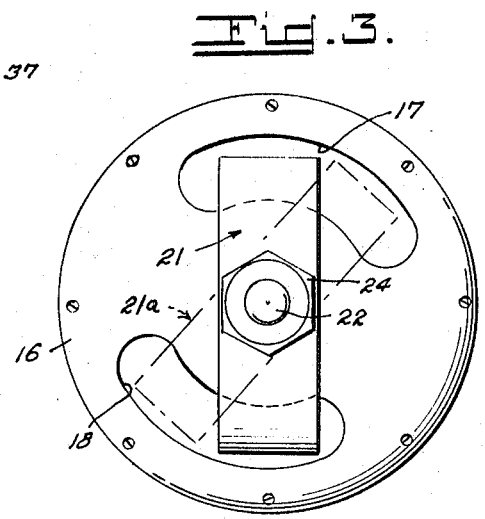
INVENTOR,
Curtis L. Wilson
BY: Harry M. Saragovitz,
Edward J. Kelly &
Herbert Berl
ATTORNEYS.

United States Patent Office 3,431,444
Patented Mar. 4, 1969

3,431,444
GENERATOR
Curtis L. Wilson, 3103 Elizabeth—Space 25,
Pueblo, Colo. 81003
Filed Dec. 14, 1966, Ser. No. 601,815
U.S. Cl. 310—168
Int. Cl. H02k 17/42, 19/24

1 Claim

The invention described herein may be manufactured and used by or for the Government, for governmental purposes, without the payment to me of any royalty thereon.

The present invention relates to a high speed, rugged electric generator of simplified construction.

An object of the invention is a new and novel electric generator of low weight and wherein the mass of the rotor thereof provides for fast starting and stopping as well as fast reversing of the rotation of said rotor.

Another object of the invention is a compact lightweight electric generator wherein the flux producing means and field coils are stationary.

A still further object of the invention is a lightweight electric generator wherein a new and novel means is incorporated for admitting and cutting off the flux to the field coils whereby a voltage is induced in the field coils.

The invention will be more fully understood and its objects and advantages further appreciated by referring now to the following detailed specification taken in conjunction with the accompanying drawings in which:

FIGURE 1 is a longitudinal section of the generator to be described as an illustrative embodiment of the present invention.

FIGURE 2 is plan view of the disc rotor of the generator of the present invention.

FIGURE 3 is a view of one end of the generator.

Referring now to FIGURE 1, the reference numeral 10 indicates a cylindrical shell which may be of non-magnetic material having affixed to one end 10a thereof by machine screws or any other suitable means an end cap 11 of magnetic material such as iron so as to serve as a magnetic return member between rear ends of the cores 12 and 13 of the field coils 14 and 15. The cores 12 and 13 are spaced 180° apart and have their rear ends in threaded engagement with end cap 11. The opposite end 10b of shell 10 is provided with an end cap 16 which may be of non-magnetic material and which may be fastened to end 10b by machine screws or by other suitable means. The end cap 16 is provided with two arcuate slots 17 and 18 through which the arms 19 and 20 of the U-shaped permanent magnet 21 pass and are rotatable therein. The permanent magnet 21 is rotatably mounted on the threaded stud 22 formed on end cap 16 and positioned and retained thereon by means of spacer 23 and nut 24, respectively. The arms 19 and 20 of permanent magnet 21 are in alignment with the field coils 14 and 15 and spaced therefrom. A shaft 25 of stainless steel or other material having low magnetic permeability is rotationally mounted in bearings 26 and 27 supported in end caps 16 and 11, respectively, has a projecting part 28 which extends beyond end cap 11 so that shaft 25 may be driven by mechanical power applied to pulley 29 mounted thereon or any other coupling means.

A metallic disc 30 comprising the rotor of the generator is formed with pairs of equally spaced slots directed inwardly of the peripheral surface of disc 30. For example, slots 34 and 35 form a pair of slots along the y axis as shown in FIGURE 2. Reference numeral 38 indicates a central perforation in disc 30 to accommodate the shaft 25. Disc 30 is mounted on shaft 25 and positioned thereon between the field coils 14 and 15 and arms 19 and 20 of the permanent magnet for rotation therebetween. Disc 30 may be affixed to shaft 25 by means of flange 32 formed on the shaft and nut 33 or it may be made integral with the shaft.

As can be seen by reference to FIGURE 1 of the drawings, maximum flux is obtained in the magnetic path formed between arm 19, field coil 14, end cap 11, field coil 15 and arm 20 when slots 34 and 35 or slots 36 and 37 are in register with aforementioned arms and coils and minimum when a solid portion of the disc 30 is in register. In operation, the rotating disc 30 interrupts or chops the magnetic flux existing between the arms of the permanent magnet and the field coils thereby creating a varying flux resulting in a voltage being induced in the field coils.

To provide for voltage control, permanent magnet 21 is rotatably mounted on stud 22 so that arms 19 and 20 may be angularly displaced, as indicated by reference numeral 21a, with respect to field coils 14 and 15 whereby substantially all or a fraction of the flux emanating from arms 19 and 20 may link the windings of the aforementioned field coils.

I claim:
1. An electric generator comprising in combination a housing consisting of a cylindrical member, a first end cap of magnetic material provided with a central perforation affixed to one end of said cylindrical member, first bearing means affixed in said perforation, a second end cap affixed to another end of said cylindrical member having a threaded boss formed centrally thereon and extending exteriorly thereof, second bearing means supported by said second end cap within said housing and in alignment with said first bearing means, oppositely disposed arcuate slots formed in said second end cap, a U-shaped permanent magnet rotatably mounted on said threaded base with its two legs passing through said arcuate slots into interior of said housing, a first field coil in said housing affixed to said first end cap and spaced from and in alignment with one of said legs, a second field coil in said housing affixed to said first end cap and spaced from and in alignment with the other of said legs, a shaft rotationally mounted in said bearings having one end extending exteriorly of said first end cap to which driving power is applied, a metallic disc provided with radial slots mounted on said shaft for rotation between said legs and said field coils, said disc upon rotation chopping the flux linking said legs and said field coils whereby a voltage is induced in said field coils.

References Cited

UNITED STATES PATENTS 1,401,883  12/1921  Crabb _____ 310—155

MILTON O. HIRSHFIELD, *Primary Examiner.*

L. ROUSE, *Assistant Examiner.*